United States Patent [19]

Teot

[11] 3,770,390

[45] Nov. 6, 1973

[54] CRYSTAL HABIT MODIFICATION OF INORGANIC SALTS USING POLYMERIC SULFONATES OR SULFATES

[75] Inventor: Arthur S. Teot, Midland, Mich.

[73] Assignee: The Dow Chemical Company, Midland, Mich.

[22] Filed: Feb. 26, 1971

[21] Appl. No.: 119,396

[52] U.S. Cl. .................................. 23/300, 423/551
[51] Int. Cl. ............................................. B01d 9/02
[58] Field of Search ............................. 23/300, 121

[56] References Cited
UNITED STATES PATENTS
2,226,101   12/1940   Ogden ................................... 23/300
2,642,335   6/1953    May et al. ............................. 23/300
2,720,446   10/1955   Whetstone et al. .................... 23/300
3,037,849   6/1962    Frint et al. ............................ 23/300
3,248,182   4/1966    Herink et al. ......................... 23/300
3,271,106   9/1966    Nylander .............................. 23/121

OTHER PUBLICATIONS

Buckley, "Crystal Growth" (Wiley & Sons, New York, 1951), pp. 373–377.
Whetstone, "Modification of Crystal Habit of Inorganic Salts with Dyes," Nature, Vol. 168 No. 4276. p. 663–664 (1951)

Primary Examiner—Norman Yudkoff
Assistant Examiner—R. T. Foster
Attorney—Griswold & Burdick, Stephen S. Grace and Lloyd S. Jowanovitz

[57] ABSTRACT

Disclosed herein is an improved method for crystallizing water-soluble inorganic salts. The improvement comprises adding to the crystallizing system a small amount of a monovalent salt of a polymeric sulphonate or sulfate characterized by the formula:

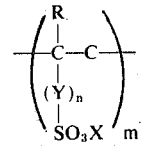

wherein R is hydrogen or methyl, m is an integer from 3 to 3,000, n is 0 or 1, and Y is a connecting group which is oxo, phenyl, phenoxy, carboxy alkyl or similar organic radical. The X portion of the sulphonate or sulfate group is a monovalent cation such as hydrogen, lithium, sodium, potassium and ammonium. The resulting crystals are larger and more regularly shaped than crystals produced by prior art methods.

4 Claims, No Drawings

CRYSTAL HABIT MODIFICATION OF INORGANIC SALTS USING POLYMERIC SULFONATES OR SULFATES

BACKGROUND OF THE INVENTION

In the art of crystal habit modification, it is known that sulphonated alkyl diphenyl ether surfactants can sometimes be employed to modify crystallization of specific inorganic salts from an aqueous media (e.g., Nylander U.S. Pat. No. 3,271,106). Also polyacrylic acid and its salts, e.g., sodium polyacrylate, have been employed as crystal modifiers. Where successful, the crystals produced from the sulphonate containing media are larger, more uniform and/or possess a more desirable shape than is the case where crystallization is allowed to proceed naturally. For example, the crystal bulk density is increased for more economical shipping. Also, larger crystals have improved filterability. Unfortunately, the mechanism by which crystal modification is achieved is not well understood and, as a result, success or failure of a particular crystal modification technique is highly empirical.

The present invention is based upon the discovery that monovalent polymeric sulphonates or sulfates of the prescribed formula improve crystallization of water-soluble inorganic salts such as $(NH_4)_2SO_4$, $KNO_3$, $KCl$ and $K_2SO_4$ from their respective aqueous solutions.

SUMMARY OF THE INVENTION

In the present invention, a small amount of the polymeric sulphonate or sulfate is added to an aqueous solution of a water-soluble inorganic salt. Crystallization of the salt is then brought about by conventional means such as evaporation of the solvent, or cooling, or a combination of both methods. The resulting crystals are both larger and/or more symmetrical than if crystallization had been allowed to proceed without incorporation of the sulphonate or sulfate into the crystallization media. This permits, among other things, easier filtration of such crystals.

In the crystallization process, the amount of sulphonate or sulfate employed is from about 0.0005 to about 0.5 weight percent of the amount of inorganic salt solubilized prior to the beginning of crystallization. Preferably, the amount of sulphonate or sulfate employed is from about 0.005 to about 0.1 percent by weight of the inorganic salt.

The polymeric sulphonate or sulfate is characterized by the formula:

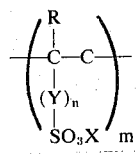

wherein R is hydrogen or methyl, $m$ is an integer from about 3 to about 3000, $n$ is 0 or 1 and Y is a connecting group or radical which can be oxo, phenyl, phenoxy, carboxy alkyl, methylene oxy, benzyl or similar organic radical. The X portion of the sulphonate group is a monovalent cation. Suitable ions include hydrogen, lithium, sodium, potassium and ammonium.

Suitable monovalent salts of sulphonates and sulfates are, for example, polystyrene sulfonate, polysulfoethyl methacrylate, polyvinylsulfonate, polyvinylsulfate, polyvinyltoluene sulfonate, polyallyl sulfate, vinyl phenyl ether sulfonate, polyvinylbenzyl sulfonate. Polymeric compounds with a molecular weight of from about 300 to about 1,000,000 can be employed.

Preferably, in carrying out the crystallization process of the invention, water, sulphonate or sulfate and the inorganic salt are admixed. The mixture is heated sufficiently to solubilize the reagents, and the resulting solution is filtered to remove any solid material. The mixture is then allowed to cool slowly to about 25° C. over a period of several hours during which time crystal formation occurs.

A particular group of water-soluble, monovalent inorganic salts which are modified by the polymeric compounds disclosed are those relating to fertilizer production: ammonium sulfate, potassium nitrate, potassium chloride and potassium sulfate.

The following examples are submitted to illustrate the invention:

EXAMPLE I

The following materials were charged into a large beaker: 1,400 grams of deionized water, 254.2 grams of $K_2SO_4$ and 5 grams of a 1 percent (by weight) aqueous solution of sodium polystyrene sulphonate (SPSS) (molecular weight: 30,000).

The sulphonate present was about 0.02 percent by weight of the potassium sulfate. The mixture was heated to boiling and was filtered through a two micron filter into a 2 liter flask. The flask was placed in a large heated water bath. The mixture was agitated slowly as the temperature was allowed to decrease gradually to room temperature. The cooling rate was about 8°/hour and the time required for cooling was about 4.1 hours.

The $K_2SO_4$ crystallized in the form of large rhombohedrons without fines or rods.

EXAMPLE II

Similar results were obtained when 0.1 percent (0.002 percent of sulfonate based on $K_2SO_4$) SPSS of a higher molecular weight, i.e., 780,000 was added to solution of 273 grams of $K_2SO_4$ in 1,500 grams of $H_2O$ and the solution crystallized as above. In the absence of the sulphonate, the $K_2SO_4$ crystallizes as a mixture of poorly formed rhombohedrons, rods of various sizes, twined crystals and fines.

EXAMPLE III

Using $KNO_3$ as the salt (1,100 grams $KNO_3$ in 1,000 grams $H_2O$), crystallization was carried out under conditions substantially similar to those in Example I. The concentration of sulphonate, however, was about 0.001 percent based on the weight of the $KNO_3$. The $KNO_3$ crystallized as a triclinic form with rounded edges. Without the sulfonate addition, $KNO_3$ crystals contained a number of smaller, malformed triclinic crystals.

EXAMPLE IV

Using KCl as the salt (637 grams KCl in 1,400 grams $H_2O$), crystallization was carried out under conditions substantially similar to those in Example I. The concentration of sulphonate, however, was about 0.001 percent based on the weight of the KCl. The KCl crystals changed from a normal cubic habit to a rounded orthohombic shape.

EXAMPLE V

Using copper sulfate as the salt (684 grams $CuSO_4 \cdot 5H_2O$ in 1,100 grams $H_2O$), crystallization carried out under conditions substantially similar to Example I. The concentration of the sulfonate was about 0.015 percent based on the weight of $CuSO_4 \cdot 5H_2O$. The crystals formed were larger than those produced without the addition of SPSS.

EXAMPLE VI

Using potassium chromate as the salt (960 grams $K_2CrO_4$ in 1,400 grams $H_2O$), crystallization was carried out under conditions substantially similar to Example I. The concentration of the sulphonate was 0.002 percent based on the weight of $K_2CrO_4$. The crystals formed were larger than those produced without the addition of SPSS.

EXAMPLE VII

Solutions of potassium sulfate (455 g. $K_2SO_4$ in 2,500 grams $H_2O$) and ammonium sulphate (1127 grams $(NH_4)_2SO_4$ in 1,128 grams $H_2O$) were crystallized under conditions substantially similar to those of Example I both without and with the presence of SPSS in three (0.001 percent, 0.003 percent and 0.006 percent based on $K_2SO_4$ weight) concentrations.

In all samples where sulfonate was added, the crystals were larger, and at higher concentrations, more irregular, than the crystals made without the sulfonate additive.

EXAMPLE VIII

The same experiments were carried out as in Example VII using sodium polysulfoethylmethacrylate instead of SPSS. Similar results in crystal modification were observed.

I claim:

1. In a process for crystallizing water-soluble inorganic salts from an aqueous system, the improvement, which comprises, crystallizing said salt from said aqueous system in the presence of a small amount of a monovalent inorganic salt of polymeric sulphonate or sulfate having a molecular weight ranging from about 300 to about 1,000,000 selected from the group consisting of polystyrene sulfonate, polysulfoethyl methacrylate, polyvinylsulfonate, polyvinylsulfate, polyvinyltoluene sulfonate, polyallyl sulfate, vinyl phenyl ether sulfonate and polyvinylbenzyl sulfonate.

2. The process as in claim 1 wherein the water soluble inorganic salt is selected from the group consisting of potassium nitrate, potassium sulfate, potassium chloride, and ammonium sulfate.

3. A process as in claim 1 wherein from about 0.0005 to about 0.5 weight percent of polymeric sulphonate or sulfate is present in the aqueous system based on the weight of inorganic salt present therein.

4. A process as in claim 2 wherein the polymeric sulphonate is sodium polystyrene sulfonate or sodium polysulfoethylmethacrylate.

* * * * *